(12) United States Patent
Paterik et al.

(10) Patent No.: US 7,263,177 B1
(45) Date of Patent: *Aug. 28, 2007

(54) METHOD AND SYSTEM FOR OPERATING INTERACTIVE VOICE RESPONSE SYSTEMS TANDEM

(75) Inventors: Thomas L. Paterik, Kansas City, MO (US); Warren B. Cope, Olathe, KS (US); Michael C. Kreamer, Flower Mound, TX (US); Lori Lynne Brown, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/888,201

(22) Filed: Jul. 9, 2004

Related U.S. Application Data

(63) Continuation-in-part of application No. 10/414,545, filed on Apr. 15, 2003.

(51) Int. Cl.
 *H04M 11/06* (2006.01)
(52) U.S. Cl. .............................. 379/88.18; 379/93.17; 379/265.09; 370/353
(58) Field of Classification Search ............ 379/93.17, 379/90.01, 88.17, 265.09, 88.18; 370/352, 370/353
 See application file for complete search history.

(56) References Cited

U.S. PATENT DOCUMENTS

| | | | |
|---|---|---|---|
| 5,029,199 A | 7/1991 | Jones et al. | |
| 5,471,521 A | 11/1995 | Minakami et al. | |
| 5,668,854 A | 9/1997 | Minakami et al. | |
| 5,729,600 A | 3/1998 | Blaha et al. | |
| 5,946,386 A | 8/1999 | Rogers et al. | |
| 6,044,142 A | 3/2000 | Hammarstrom et al. | |
| 6,130,933 A | 10/2000 | Miloslavsky | |
| 6,163,535 A | 12/2000 | Jordan et al. | |
| 6,229,880 B1 | 5/2001 | Reformato et al. | |
| 6,304,645 B1 | 10/2001 | Holland et al. | |
| 6,335,964 B1 | 1/2002 | Bowater et al. | |
| 6,353,608 B1 | 3/2002 | Cullers et al. | |
| 6,373,939 B1 | 4/2002 | Reese et al. | |
| 6,396,909 B1 | 5/2002 | Reksten et al. | |
| 6,418,201 B1 | 7/2002 | Holland et al. | |
| 6,421,427 B1 | 7/2002 | Hill et al. | |
| 6,459,788 B1 | 10/2002 | Khuc et al. | |
| 6,473,505 B1 | 10/2002 | Khuc et al. | |
| 6,480,599 B1 | 11/2002 | Ainslie et al. | |
| 6,512,818 B1 | 1/2003 | Donovan et al. | |
| 6,553,112 B2 | 4/2003 | Ishikawa et al. | |
| 6,556,563 B1 | 4/2003 | Yarlagadda | |
| 6,829,348 B1* | 12/2004 | Schroeder et al. | 379/265.09 |

(Continued)

OTHER PUBLICATIONS

Office Action, mailed Feb. 26, 2007, for U.S. Appl. No. 10/414,545.

*Primary Examiner*—Gerald Gauthier

(57) ABSTRACT

First and second voice interactive response systems operate in tandem. The first voice response system receives a call from a caller and interacts with the caller to provide information to the caller and/or obtain information from the caller. To make additional media services (e.g., automatic speech recognition or text-to-speech conversion) available for the interaction with the caller, the first voice response system extends the call to a second voice response system that is able to provide the additional media services.

23 Claims, 3 Drawing Sheets

U.S. PATENT DOCUMENTS

| | | | |
|---|---|---|---|
| 6,885,737 B1 * | 4/2005 | Gao et al. | 379/93.17 |
| 6,928,469 B1 | 8/2005 | Duursma et al. | |
| 7,027,571 B1 * | 4/2006 | Cook | 379/88.17 |
| 2003/0007609 A1 | 1/2003 | Yuen et al. | |
| 2003/0202504 A1 * | 10/2003 | Dhara et al. | 370/352 |

* cited by examiner

METHOD AND SYSTEM FOR OPERATING INTERACTIVE VOICE RESPONSE SYSTEMS TANDEM

CROSS-REFERENCE TO RELATED APPLICATIONS

This application is a continuation-in part of U.S. application Ser. No. 10/414,545, filed Apr. 15, 2003, titled "Distributed Interactive Media System," which application is fully incorporated herein by reference.

BACKGROUND

1. Field of the Invention

The present invention relates to telecommunications and, more particularly, to interactive voice response systems that are operated in tandem.

2. Description of Related Art

Many telecommunications networks and other enterprises provide interactive media services, e.g., audio services, that users can access by telephone. For example, an interactive voice response (IVR) system may receive audio input from the user, such as speech or DTMF tones, and responsively provides the user with services, such as information, voice mail access, e-mail access, Web browsing, voice activated dialing (VAD), or the ability to do banking or other transactions. Currently, such interactive voice response systems are typically highly integrated, often with proprietary architectures. This makes interactive voice response systems difficult to modify so as to increase capacity or to provide new services. Such systems are also substantially expensive, making them out of reach for many enterprises. Accordingly, there is a need for flexible and low-cost systems and methods for providing interactive media services.

SUMMARY

In a first principal aspect, exemplary embodiments of the present invention relate to a distributed interactive media system comprising a first voice response system for interacting with a caller in a communication session, a second voice response system that includes a browser and at least one media resource, and a telecommunications network communicatively coupled to the first and second voice response systems. The first voice response system involves the second voice response system in the communication session when a predetermined condition is met.

In a second principal aspect, exemplary embodiments of the present invention relate to a method of providing an interactive media service. In accordance with the method, a first voice response system receives a call from a caller. The first voice response system forwards the call and at least one call identifier to a second voice response system. The second voice response system includes at least one media resource. The second voice response system obtains an interactive application based on the at least one call identifier, and the second voice response system controls the at least one media resource in accordance with the interactive application.

DETAILED DESCRIPTION OF EXEMPLARY EMBODIMENTS

1. Overview

Figure 1:
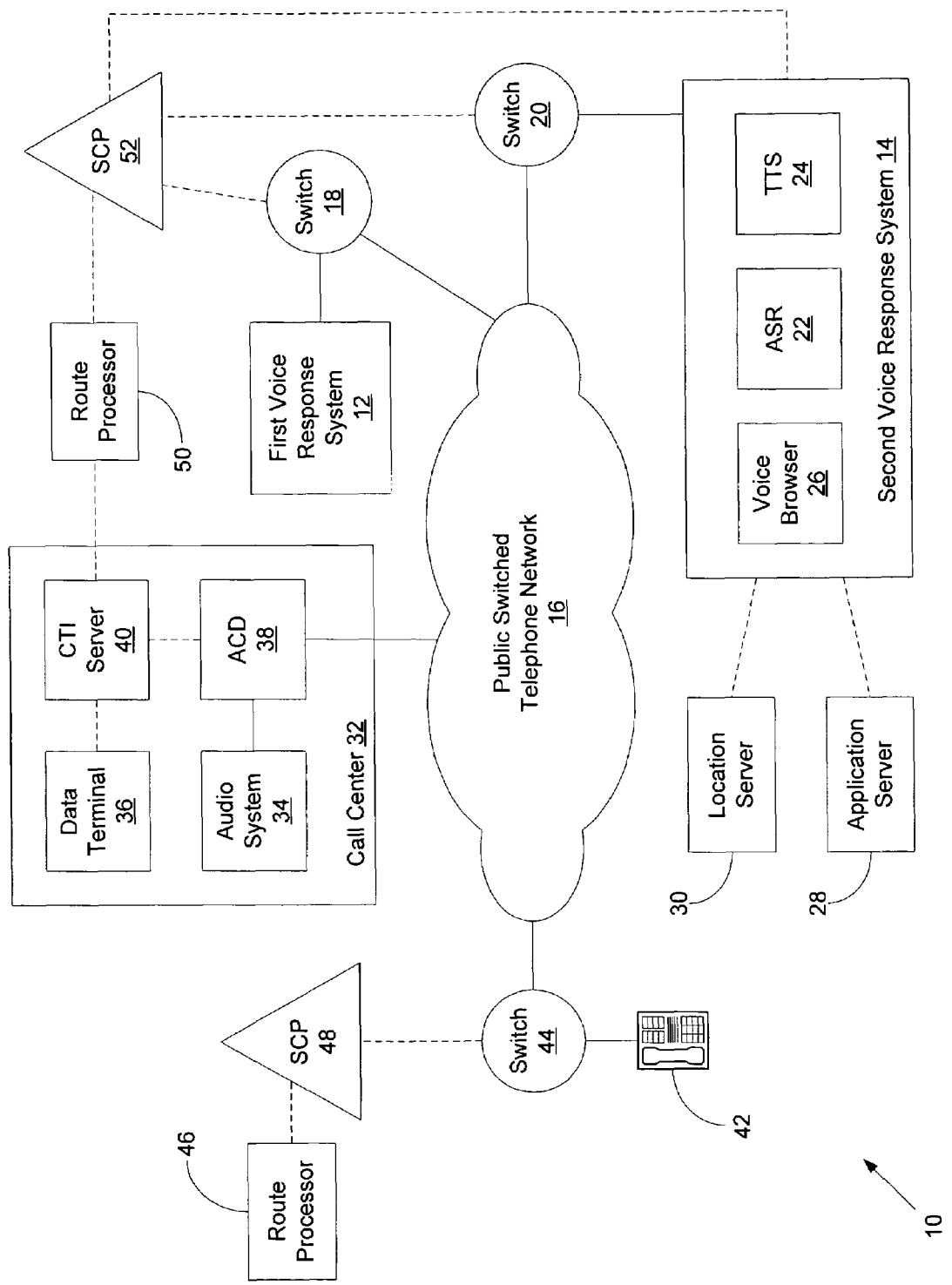
FIG. 1 is a simplified block diagram of a telecommunications system, in accordance with an exemplary embodiment of the present invention.

The present invention, in its preferred embodiments, provides a distributed interactive media system that includes at least a first voice response system and a second voice response system. The first and second voice response systems may be operated in tandem. For example, initially the first voice response system may be involved in a communication session (such as a voice call) with a caller. Then, when a predetermined condition is met, the first voice response system may involve the second voice response system in the communication session, e.g., by extending the communication session to the second voice response system. For example, the first voice response system may originate a voice call to the second voice response system. When the second voice response system becomes involved in the communication session, the first voice response system may either remain involved or may disengage from the communication session.

The first voice response system may involve the second voice response system in the communication session in order to use one or more media resources in the second voice response system. Such media resources may include, for example, automatic speech recognition (ASR) engines and/or text-to-speech (TTS) engines. In an exemplary embodiment, the media resources in the second voice response system may provide better performance or additional capabilities than the first voice response system. For example, the first voice response system may be an interactive voice response (IVR) system that relies on DTMF tones to receive input from the caller and on prerecorded speech to provide voice prompts to the user. For certain interactive applications these limited capabilities may be sufficient. However, in order to be able to recognize the caller's speech, provide synthesized speech to the caller, or other capabilities, the first voice response system may involve the second voice response system, so that ASR engines, TTS engines, and/or other media resources in the second voice response system may be used during the communication session with the caller. In some cases, the first voice response system may involve the second voice response system as soon as the first voice response system receives the call, e.g., in response to the called telephone number or other call identifier. In other cases, the first voice response system may involve the second response system only after interacting with the caller. For example, the interaction with the caller may reach a point where voice recognition and/or other capabilities of the second voice response system would be beneficial. In general, an application that controls the first voice response system's interaction with the caller may determine when to involve the second voice response system.

In an exemplary embodiment, the first voice response system may involve the second voice response system by extending the call to the second voice response system through a telecommunications network. If the telecommunications network is a circuit-switched network (such as the PSTN), then extending the call may involve the first voice response system either forwarding the call or originating a new voice call to the second voice response system. If the telecommunications network is a packet-switched network, then the first telecommunications network may establish a voice-over-packet (VoP) session with the second telecommunications network. In either case, once the communication session is extended to the second voice response system, the first voice response system may either disengage from the communication session (e.g., using release link trunking) or may remain involved in the communication session.

The first voice response system may also provide a call identifier to the second voice response system. In an exemplary embodiment, the first voice response system provides the call identifier in the signaling used to extend the communication session to the second voice response system. The call identifier may correspond to the directory number the caller used to reach the first voice response system, e.g., the call identifier may be a dialed number identification service (DNIS) number. Alternatively or additionally, the call identifier may identify the originating telephone number or a trunk group, or it may identify the call in some other way. As described in more detail below, the second voice response system may use the call identifier to identify the particular interactive application to use during the communication session with the caller.

In an exemplary embodiment, the second voice response system may be configured as a distributed service node, for example, as disclosed in U.S. Ser. No. 10/414,545, which is incorporated herein by reference. Thus, the second voice response system may include a voice browser, one or more media resources, such as ASRs and TTSs, and other components communicatively coupled in a distributed fashion, e.g., via a local area network (LAN). In an exemplary embodiment, the media resources and other components in the second voice response system may exchange voice or other media in a streaming packet format, e.g., using the Real-Time Transfer Protocol (RTP). If the first voice response system uses the PSTN to communicate with the second voice response system, a media gateway or other packetization system may be used to convert between the circuit-switched media format used in the PSTN and the packetized media format used in the second voice response system.

To provide interactive media services to the caller, the voice browser may interpret an interactive application written in a predetermined format, such as a voice extensible markup language (VXML) format or other format, and responsively invoke media resources in accordance with the interactive application. An exemplary VXML format is described in "Voice Extensible Markup Language (VoiceXML) Version 2.0" (Apr. 24, 2002 Working Draft of World Wide Web Consortium), which is incorporated herein by reference.

In an exemplary embodiment, the voice browser may obtain the VXML document from an application server, e.g., using the HyperText Transfer Protocol (HTTP). A recent version of HTTP is described in "Hypertext Transfer Protocol—HTTP/1.1," Request for Comments 2616 (June 1999), which is incorporated herein by reference. The application server may be a separate network element, e.g., accessible via a packet-switched network. In some cases, the first voice response system may function as the application server. A Universal Resource Locator (URL) or other identifier may be used to identify the application server and/or the VXML document on the application server that corresponds to a particular interactive application. Thus, to obtain the VXML document, the browser may send an HTTP GET request to the corresponding URL.

The voice browser may query a location server to obtain this URL. The location server may associate URLs with call identifiers. Thus, the second voice response system may receive a call identifier from the first voice response system, and the browser may include this call identifier in its query to the location server. The location server may respond with the URL associated with this call identifier, and the voice browser may then use this URL to obtain the interactive application from the application server, e.g., as a VXML document. In an exemplary approach, the location server may function as a redirection server, returning an HTTP redirection 3xx response with the URL in response to an HTTP GET request with the call identifier from the voice browser.

The second voice response system may also support the capability to connect the caller to a live operator. In an exemplary embodiment, the live operator is at a call center, where the live operator uses a telephone or audio system to communicate with the caller and has a data terminal to display information collected during the communication session with the caller. When the second voice response system determines that a connection to a live operator is required, the second voice response system may cause an outbound call to be made to a call center and may also push the information collected from the caller to the call center. In this way, the information collected from the caller can appear on the operator's data terminal when the operator receives the call, as described in more detail below.

2. Exemplary Architecture

Referring to the drawings, FIG. 1 is a simplified block diagram of an exemplary telecommunications system 10 in which exemplary embodiments of the present invention may be employed. In FIG. 1, solid lines indicate connections that carry primarily voice or other media, and dashed lines indicate connections that carry primarily data and signaling.

Telecommunications system 10 includes a first voice response system 12 and a second voice response system 14. Voice response systems 12 and 14 may be communicatively coupled via a circuit-switched network, such as the public switched telephone network (PSTN) 16. For example, particularly, first voice response system 12 may be connected to PSTN 16 via a switch 18, and second voice response system 14 may be connected to PSTN 16 via a switch 20.

In an exemplary embodiment, first voice response system 12 may have a highly integrated, proprietary architecture, whereas second voice response system 14 may have a distributed architecture that uses open standard protocols. For example, second voice response system 14 may be configured as a distributed service node, as described in U.S. application Ser. No. 10/414,545, filed Apr. 15, 2003, which is incorporated herein by reference.

Thus, second voice response system 14 may include one or more media resources. Such media resources may include an automatic speech recognition (ASR) engine 22 and a text-to-speech (TTS) engine 24. ASR 22 is able to provide a textual interpretation of a caller's speech, i.e., to convert speech into text. ASR 22 may also be able to recognize other audio signals, such as DTMF tones. TTS 24 is able to provide synthesized speech to a caller, based on text that it receives, i.e., to convert text into speech. Such ASR and TTS engines are commercially available, for example, from Nuance Communications, Inc., Menlo Park, Calif. Although second voice response system 14 is shown with only one ASR and one TTS, it is to be understood that second voice response system 14 could include a greater number of these media resources and/or may include other types of media resources. In this regard, second voice response system 14 may include a resource manager that performs load balancing among the media resources.

Second voice response system may also include a voice browser 26. As described in more detail below, voice browser 26 interprets interactive applications, which may be provided in a VXML or other format, and invokes media resources, e.g., ASR 22 and TTS 24, in accordance with the interactive applications. More particularly, voice browser 26 may obtain the interactive application, in VXML or other format, from an application server 28, and voice browser 26 may determine the location of the interactive application by querying a location server 30. Second voice response system 14 may be communicatively coupled to application server 28 and location server 30 via a packet-switched network, such as the Internet or a local area network (LAN). In an exemplary embodiment, first voice response system 12 may function as application server 28.

First voice response system 12 is also communicatively coupled to a call center 32, e.g., PSTN 16. Call center 32 is a center that callers can reach in order to speak with one or more live operators. Each live operator may have access to an audio system 34, such as a telephone, for voice communication with a particular caller and a data terminal 36 for displaying information regarding the caller. Although call center 32 is shown in FIG. 1 with only one audio system and only one data terminal, in general, call center 32 may include a plurality of audio systems and a plurality of data terminals. The audio systems may be connected to an automatic call distributor (ACD) 38, which, in turn, is connected to PSTN 16. The data terminals may be connected to a CTI server 40, which may also control ACD 38.

First voice response system 12 can be reached by a caller using a communication device, such as a landline telephone, wireless telephone, or audio-equipped computer. For example, FIG. 1 illustrates an embodiment in which the caller uses a landline telephone 42 that is connected to PSTN 16 via a switch 44. Once a caller reaches first voice response system 12, system 12 runs an interactive application to provide interactive services to the caller. First voice response system 12 may be able to provide different interactive services to callers, e.g., by executing different applications. First voice response system 12 may select what application to run based, for example, on the directory number that the caller dialed to reach first voice response system 12.

First voice response system 12 may receive input from a caller as part of the interactive service. For example, the caller may use DTMF tones to enter numbers or letters or to select menu items. First voice response system 12 may also provide output to the user as part of the interactive service. For example, first voice response system 12 may play prerecorded messages to provide instructions or options to the caller and/or to provide selected information to the caller. In addition, first voice response system 12 may also involve other systems in the call, e.g., to make additional media resources available for the interactive service. Such other systems may include second voice response system 14, as described in more detail below. Second voice response system 14 may also involve other systems in the call. For example, second voice response system 14 may connect the caller to a live operator at a call center.

Thus, a caller may dial a particular directory number, in order to access a desired interactive service, and may be connected to first voice response system 12. At some point, first voice response system 12 may involve second voice response system 14 in the call, in order to provide additional media services (e.g., voice recognition and/or text-to-speech services). Then, at a later point in the call, second voice response system 14 may provide the caller with access to a live operator at a call center.

In some cases, more than one voice response system may be available to receive a call from a caller desiring access to a particular interactive service. Similarly, more than one voice response system may be available to provide the additional media resources for the interactive service, and more than one call center may be available to provide access to a live operator. In such cases, route processors may be used to select which voice response system or call center to use for a particular call. A route processor may make a selection based on load (i.e., to facilitate load balancing), time of day, and/or other factors. For example, system 10 may include a route processor 46 for selecting which voice response system to route the initial call from a caller. As described in more detail below, route processor 46 may be accessed by a service control point (SCP) 48 that is communicatively coupled to switch 44. Similarly, system 10 may include a route processor 50 for selecting which call center to use to connect a caller to a live operator. As described in more detail below, route processor 50 may be accessed by an SCP 52 that is communicatively coupled to switch 18. In addition, route processor 50 may be communicatively coupled to CTI server 40, e.g., via a packet-switched network.

In telecommunications system 10 shown in FIG. 1, first voice response system 12 and second voice response 14 are communicatively coupled via PSTN 16. Thus, first voice response system 12 can involve second voice response system 12 in a communication session with a caller by originating a call to a directory number associated with second voice response system 12. The call is routed through PSTN 16, and, when completed, a voice communication path between first voice response system 12 and second voice response system 14 is established through PSTN 16. Alternatively or additionally, first voice response system 12 and second voice response system 14 may be communicatively via a packet-switched network 54, as in telecommunications system 10' shown in FIG. 2.

Packet-switched network 54 may include one or more local area networks (LANs) and/or one or more wide area networks (WANs), such as the Internet. Packet-switched network 54 may route packets based on network addresses, such as by using the Internet Protocol (IP) protocol in combination with the User Datagram Protocol (UDP) or Transmission Control Protocol (TCP). The IP packets may be carried over lower level protocols, such as asynchronous transfer mode (ATM) protocols. A protocol, such as the Session Initiation Protocol (SIP) may be used to set up and control communication sessions in packet-switched network 54. In such communication sessions, a protocol such as the Real-Time Transport Protocol (RTP) may be used to carry media in a real-time packet format through packet-switched network 54. Relevant aspects of SIP are described in Rosenberg, et al., "SIP: Session Initiation Protocol," Request for Comments 3261 (June 2002), which is incorporated herein by reference. Relevant aspects of RTP are described in Schulzrinne, et al., "RTP: A Transport Protocol for Real-Time Applications," Request for Comments 1889 (January 1996), which is incorporated herein by reference.

Figure 2:
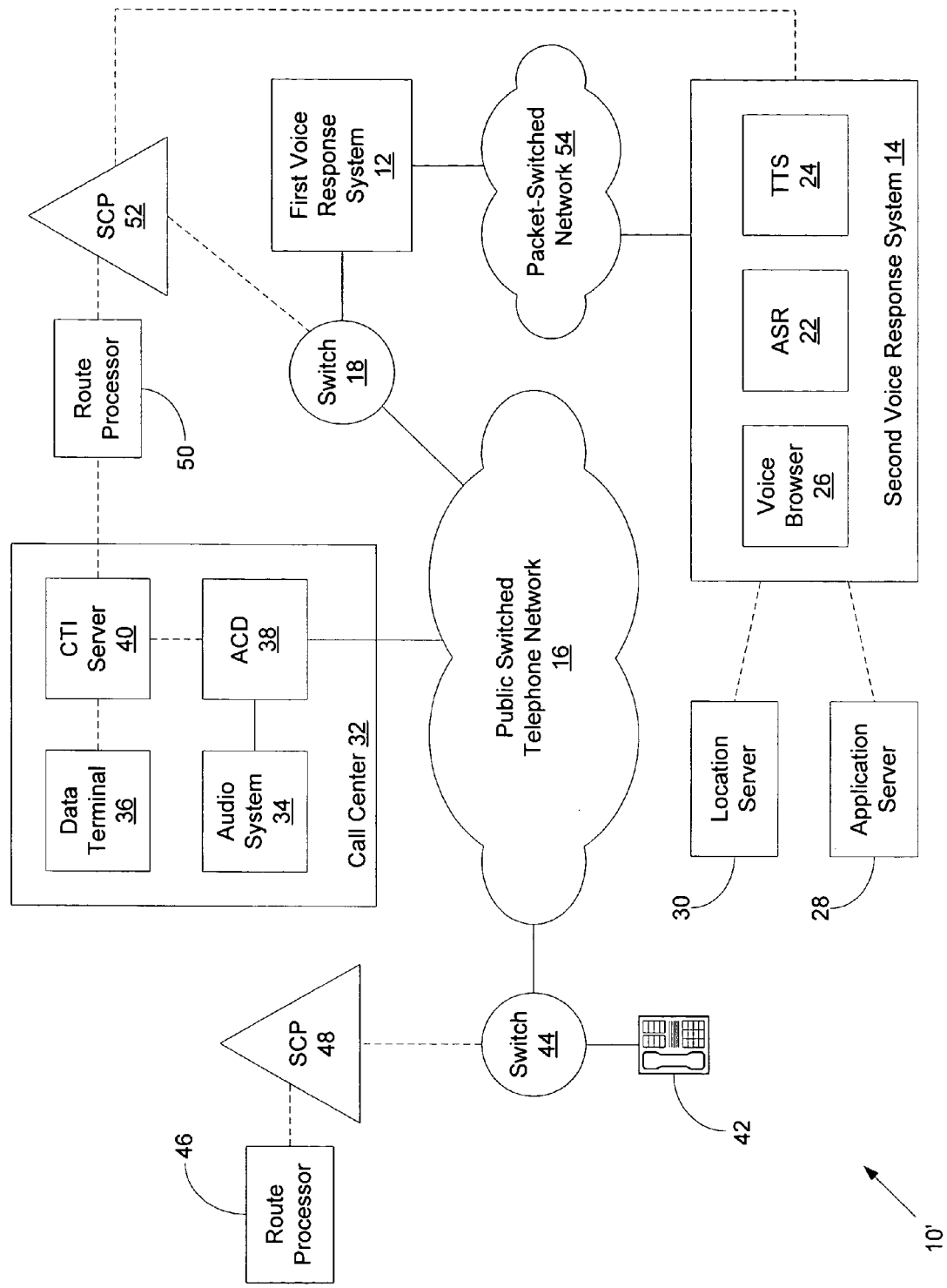
FIG. 2 is a simplified block diagram of an alternate telecommunications system, in accordance with an exemplary embodiment of the present invention.

Thus, in telecommunications system 10' shown in FIG. 2, first voice response system 12 may involve second voice response system 20 in a communication session with a caller by setting up a communication session through packet-switched network 54, e.g., using SIP. Once the communication is established, voice or other media may be conveyed between first voice response system 12 and second voice response system 14, via packet-switched network 54, in a real-time packet format.

In addition, packet-switched network 54 may carry other signaling and/or data communication. For example, second voice response system 14 may be communicatively coupled to application server 28 and/or location server 30 via packet-switched network 54. Similarly, route processor 50 and CTI server 40 may be communicatively coupled via packet-switched network 54.

3. Exemplary Operation

Figure 3:
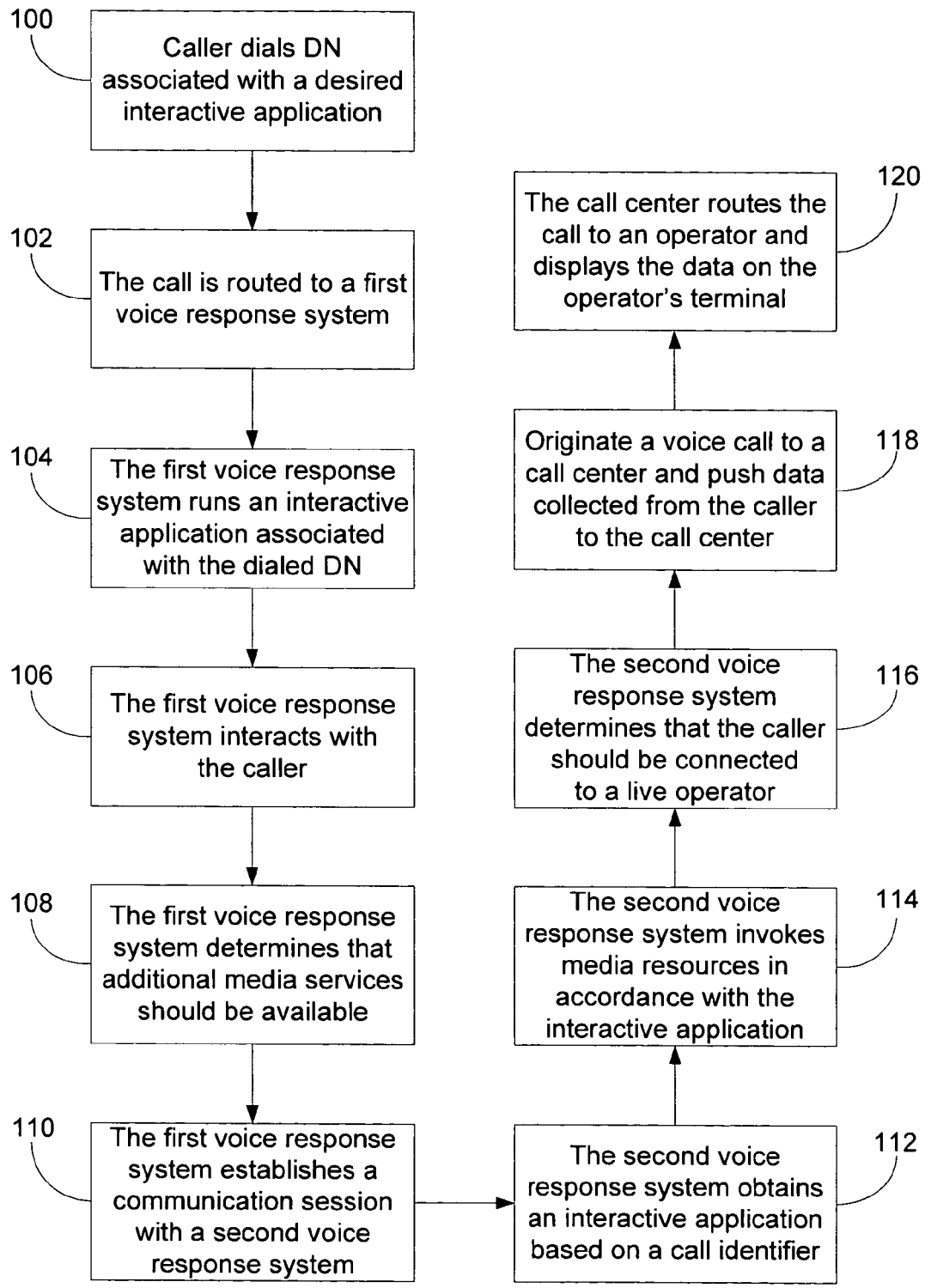
FIG. 3 is a flow chart illustrating a method of operation, in accordance with an exemplary embodiment of the present invention.

FIG. 3 is a flow chart illustrating an exemplary method of operation. The process may begin when a caller dials a directory number (DN) associated with a desired interactive media service, as indicated by block 100. For purposes of illustration, the caller in this example is calling from landline telephone 42, connected to switch 44. However, it is to be understood that in other cases, the caller may be calling from a wireless telephone, served by a mobile switching center (MSC) or other serving system, or the caller may be using some other communication device to place the call. The dialed DN could be an "800" or other toll-free number, a special local access number, or other directory number.

In this case, the dialed DN is associated with an interactive media service that can be provided by first voice response system 12. Thus, the call may be routed to first voice response system 12, via PSTN 16 and switch 18, as indicated by block 102. The routing of the call to first voice response system 12 could occur in different ways. In an exemplary embodiment, when switch 44 receives the dialed DN, switch 44 forwards the dialed DN to SCP 48 in a query for call processing instructions. In the case that the dialed DN is a toll-free number, this query could be part of the process of resolving the toll-free number.

SCP 48 receives the query and recognizes the dialed DN as corresponding to an interactive media service. SCP 48 may then query route processor 46 to determine where to route the call. For example, more than one voice response system may be able to provide the interactive media service, in which case route processor 46 may select a particular voice response system to use for the call. In making this selection, route processor 46 could apply time of day routing policies, load balancing policies, and/or other factors. Route processor 46 then conveys its selection to SCP 48 (first voice response system 12 in this example), and SCP 48 provides appropriate call routing instructions to switch 44. Although in this example SCP 48 queries route processor 46 to select a voice response system, in other examples, SCP 48 may make this selection without querying a route processor. In addition, SCP 48 may provide other services or implement other policies, such as code blocking, in this step.

Switch 44 receives the call routing instructions from SCP 48 and routes the call to switch 18, which, in turn, forwards the call to first voice response system 12. In this way, a voice connection is established between the caller, who is using landline telephone 42 in this example, and first voice response system 12. First voice response system 12 then runs an application to provide the interactive service to the caller, i.e., the interactive service associated with the dialed DN, as indicated by block 104. In many cases, first voice response system 12 can run several different applications to provide several different interactive services. In such cases, first voice response system 12 may select which application to run based on, for example, information provided in the signaling used to route the call to first voice response system 12. For example, the signaling may convey the dialed DN to first voice response system 12. Alternatively, the signaling could identify the interactive service in other ways.

First voice response system 12 then proceeds to interact with the caller, as indicated by block 106. In this interaction, first voice response system 12 may play prerecorded audio clips, e.g., to provide information to the caller or to explain menu choices the caller can select. In this interaction, first voice response system 12 may also collect and store information provided by the caller. For example, the caller may use a keypad on telephone 42 to input an account number, password, or other information, e.g., in the form of DTMF tones.

At some point during this interaction, first voice response system 12 may determine that additional media services, such as a speech recognition service or a text-to-speech service, should be made available, as indicated by block 108. In general, such additional media services could be made available when a precondition is met, which may depend on the particular interactive service, as controlled by the interactive application. As one example, the caller may reach a certain point in the interactive service where speech recognition may be a more efficient way to obtain information from the caller than DTMF tones. As another example, the caller may be able to request a particular service, e.g., speech recognition, for which the additional media resources may be required. If first voice response system 12 does not itself provide these additional media services, then first voice response system 12 may involve another system, e.g., second voice response system 14, which can provide the additional media services.

To get second voice response system 14 involved in the call, first voice response system 12 may establish a communication session with second voice response system 14, as indicated by block 110. This may be accomplished in various ways. If first voice response system 12 and second voice response system 14 are communicatively coupled via PSTN 16, then first voice response system 12 may place an outbound voice call, e.g., to a predetermined directory number that routes to a second voice response system. Switch 18 may then forward this predetermined directory number to SCP 52 in a query for call processing instructions. SCP 52 recognizes the predetermined number as corresponding to an interactive media service. If more than one voice response system can be used to provide the interactive media service, SCP 52 may choose which particular voice response system to use. In making this choice, SCP 52 could apply time of day routing policies, load balancing policies, and/or other factors. SCP 52 could also query a route processor, such as route processor 50, to help make the decision regarding which voice response system to use.

In this example, SCP 52 instructs switch 18 to route the call to second voice response system 14. In this way, the call is routed from first voice response system 12 to second voice response system 14, via switch 18, PSTN 16, and switch 20. The SS7 or other signaling used to route the call to second voice response system 14 may include a call identifier that identifies what interactive media service to provide the caller. The call identifier may correspond to a DNIS number, i.e., the dialed DN the caller used to reach first voice response system 12.

If first voice response system 12 and second voice response system 14 are communicatively coupled via packet-switched network 54, as shown in FIG. 2, then SIP or other signaling may be used to set up a communication session through packet-switched network 54 between first voice response system 12 and second voice response system 14. The dialed DN or other call identifier may be passed to second voice response system 14 in the SIP or other signaling used to set up the communication session. Once the communication session is established, first voice response system 12 and second voice response system 14 may exchange voice or other media in a real-time packet format.

Second voice response system 14 obtains the interactive application, e.g., in the form of a VXML document, that corresponds to the dialed DN or other call identifier that it receives, as indicated by block 112. To do this, voice browser 26 may query location server 30 to obtain the URL that corresponds to the call identifier. For example, voice browser 26 may send an HTTP GET request to location server 30 that includes the dialed DN or other call identifier, e.g., as part of a URL included in the request. Location server 30 may act as a redirection server, e.g., providing a 3xx Redirection response that includes the URL of the interactive application associated with the call identifier. In this example, the URL provided by location server 30 corresponds to application server 28. Thus, voice browser 26 sends an HTTP GET request with this URL to application server 28. In response, application server 28 sends a 200 OK response that includes the interactive application in the form of a VXML document.

Voice browser 26 the interprets the VXML document and invokes media resources in second voice response system 14, e.g., ASR 22 and/or TTS 24, in accordance with the interactive application, as indicated by block 114. In this way, second voice response system 14 may provide information to the caller, e.g., by conveying synthesized speech to the caller, and/or may collect information from the caller, e.g., by interpreting the caller's speech.

At some point during its interaction with the caller, second voice response system 14 may determine that the caller should be connected to a live operator at a call center, as indicated by block 116. Then, second voice response system 14 causes a voice call to be originated to a call center and causes the data collected from the caller to be pushed to the call center, as indicated by step 118. The connection to the live operator could be requested by the caller or could be initiated as part of the interactive service.

The process of connecting the caller to a live operator at a call center and pushing the data collected from the caller to the call center can be accomplished in various ways. In one approach, second voice response system 14 retrieves the data collected from the caller by both first voice response system 12 (e.g., after querying first voice response system 12 to obtain the data that it collected from the caller) and by second voice response system 14 to provide a set of call enter data (CED) objects. Second voice response system 14 also generates a tracking number for the CED objects. In an exemplary embodiment, the tracking number is a unique number that is in the format of a directory number. Second voice response system 14 then passes the CED objects, tracking number, and call identifier to SCP 52, e.g., using X.25 signaling or other signaling. SCP 52 stores the CED objects and call identifier so that they are keyed to the corresponding tracking number.

Second voice response system 14 also causes an outbound call to be made, e.g., to a predetermined directory number that routes to a call center. In one approach, e.g., when second voice response system 14 is connected to PSTN 16 via switch 20 as shown in FIG. 1, second voice response system 14 may itself originate the outbound call. Thus, second voice response system 14 may originate the outbound call to the predetermined directory number and may include the tracking number as the calling party number, using, for example, an automatic number identification (ANI) service. Switch 20 receives the call and queries SCP 52 for call processing instructions. The query may include the called number (i.e., a directory number to access a live operator at a call center) and the tracking number (e.g., as the calling party number).

In another approach, e.g., when second voice response system 14 is connected to first voice response system 12 via packet-switched network 54, as shown in FIG. 2, second voice response system 14 may request first voice response system 12 to originate the outbound call. To make this request, second voice response system 14 could use, for example, SIP signaling via packet-switched network 54. Second voice response system 14 may pass information, such as the call identifier, to first voice response system 12 in this signaling. When first voice response system 12 originates the outbound call, switch 18 receives the call and queries SCP 52 for call processing instructions.

Whether it receives the query from switch 20 (when second voice response system 14 originates the call) or from switch 18 (when first voice response system 12 originates the call) SCP 52 recognizes from the called number that the call should go to a call center. SCP 52 may then query a route processor, such as route processor 50, to determine which call center to route the call to. SCP 52 may also use the tracking number from the query to retrieve the CED objects (collected data) and call identifier that it stored and then pass the CED objects and call identifier to route processor 50.

Route processor 50 may determine what call center to use for the call by applying time of day policies, load balancing policies, and/or other factors. In this example, route processor 50 determines that call center 32 should be used and returns routing instructions to SCP 52. Route processor 50 also pushes the data collected from the caller (i.e., the CED objects) and the caller identifier to CTI server 40 in call center 32. In order to help call center 32 correlate this data with the voice call that comes in, route processor 50 may generate a correlation key and pass the correlation to key to both CTI server 40 and SCP 52. SCP 52 sends the routing information and the correlation key to switch 38. Switch 38 then routes the call accordingly, including the correlation key in the signaling (e.g., as a DNIS number).

In this way, call center 32 receives the call. In an exemplary embodiment, call center 32 directs the call to a particular live operator and also provides the operator with the data collected from the caller during the call, as indicated by block 120. Call center 32 may use the correlation key to correlate the caller's data with the voice call. For example, ACD 38 may receive the call and may provide the call information, including the correlation key, to CTI server 40. In response, CTI server 40 may determine which operator to send the call to and so instruct ACD 38. ACD 38 then routes the voice call so as to reach the selected operator, e.g., the operator using audio system 34. Based on the correlation key, CTI server 40 may also retrieve the data collected from the caller, i.e., the CED objects from route processor 50, and push the data to the operator's data terminal, e.g., data terminal 36. In this way, the operator can view the information collected from the caller (e.g., the caller's account number) while the operator is speaking to the caller.

CONCLUSION

Exemplary embodiments of the present invention have been described above. Those skilled in the art will understand, however, that changes and modifications may be made to these embodiments without departing from the true scope and spirit of the invention, which is defined by the claims.

What is claimed is:

1. A distributed interactive media system, said system comprising:
   a location server, said location server storing a location of an interactive application;
   an application server, said application server storing, at said location, said interactive application in a predetermined format,
   a first voice response system for interacting with a caller in a communication session; and
   a second voice response system, said second voice response system including a browser and at least one media resource, wherein said browser obtains said location from said location server and obtains said application in said predetermined format from said application server, said browser interpreting said interactive application and responsively invoking said at least one media resource;
   a telecommunications network communicatively coupled to said first and second voice response systems,
   wherein said first voice response system involves said second voice response system in said communication session when a predetermined condition is met.

2. The distributed interactive media system of claim 1, wherein said telecommunications network includes a circuit-switched network.

3. The distributed interactive media system of claim 1, wherein said telecommunications network includes a packet-switched network.

4. The distributed interactive media system of claim 1, wherein said first voice response system involves said second voice response system by extending said communication session through said telecommunications network to said second voice response system and by providing said second voice response system with a call identifier.

5. The distributed interactive media system of claim 4, wherein said call identifier includes a dialed number identification service (DNIS) number.

6. The distributed interactive media system of claim 4, wherein extending said communication session through said telecommunications network to said second voice response system comprises:
   originating a voice call to said second interactive voice system.

7. The distributed interactive media system of claim 1, wherein said at least one media resource includes at least one automatic speech recognition (ASR) engine.

8. The distributed interactive media system of claim 1, wherein said at least one media resource includes at least one text-to-speech (TTS) engine.

9. The distributed interactive media system of claim 1, wherein said browser is a voice browser and wherein said predetermined format is a voice extensible markup language (VXML).

10. The distributed interactive media system of claim 1, wherein said location server associates said location with said at least one call identifier.

11. The distributed interactive media system of claim 10, wherein said location server functions as a redirection server by identifying said location in response to a request identifying said at least one call identifier.

12. The distributed interactive media system of claim 1, wherein said first voice response system functions as said application server.

13. The distributed interactive media system of claim 1, further comprising:
   a call center, communicatively coupled to said second voice response system via said telecommunications network, said call center including an audio system for communication between said caller and a live operator and a data terminal for displaying to said live operator information collected from said caller during said communication session.

14. A method of providing an interactive media service, said method comprising:
   a first voice response system receiving a call from a caller;
   said first voice response system forwarding said call and forwarding at least one call identifier to a second voice response system, said second voice response system including a browser and at least one media resource;
   said second voice response system obtaining an interactive application based on said at least one call identifier; and
   said second voice response system controlling said at least one media resource in accordance with said interactive application by said browser interpreting said interactive application and responsively invoking said at least one media resource.

15. The method of claim 14, wherein said at least one call identifier includes a dialed number identification service (DNIS) number.

16. The method of claim 14, wherein said at least one media resource includes at least one automatic speech recognition (ASR) engine.

17. The method of claim 14, wherein said at least one media resource includes at least one text-to-speech (TTS) engine.

18. The method of claim 14, wherein obtaining an interactive application based on said at least one call identifier comprises:
   (a) said browser sending a first request to a location server, said first request identifying said at least one call identifier;
   (b) said browser receiving a location from said location server in response to said first request;
   (c) said browser sending a second request to an application server, said second request identifying said location; and
   (d) said browser receiving said interactive application from said application server in response to said second request.

19. The method of claim 14, further comprising:
   collecting information from said caller, in accordance with said interactive application.

20. The method of claim 19, further comprising:
   said second voice respond system originating an outbound call to a call center to enable said caller to speak to a live operator.

21. The method of claim 20, further comprising:
   generating a tracking identifier;
   sending said information and said tracking identifier to a control point.

22. The method of claim 21, further comprising:
   providing said tracking number in signaling to originate said outbound call.

23. The method of claim 22, further comprising:
   said live operator receiving said outbound call; and
   displaying said information to said live operator.

* * * * *